(12) United States Patent
Hiller et al.

(10) Patent No.: US 6,871,163 B2
(45) Date of Patent: Mar. 22, 2005

(54) BEHAVIOR-BASED ADAPTATION OF COMPUTER SYSTEMS

(75) Inventors: Christine Hiller, Karlsruhe (DE); Daniel M. Braxton, Jr., Plankstadt (DE); Juergen Scholl, Bretten (DE); Ralph Meiswinkel, Bad Schoenborn (DE); Dirk Rohdemann, Muehlhausen (DE)

(73) Assignee: SAP Aktiengesellschaft, Walldorf (DE)

( * ) Notice: Subject to any disclaimer, the term of this patent is extended or adjusted under 35 U.S.C. 154(b) by 243 days.

(21) Appl. No.: 10/159,526

(22) Filed: May 31, 2002

(65) Prior Publication Data

US 2003/0225550 A1 Dec. 4, 2003

(51) Int. Cl.⁷ .......................... G06F 11/30; G06F 17/60; G06F 7/00; G09G 5/00; G06N 5/02
(52) U.S. Cl. .......................... 702/186; 705/10; 345/745; 706/47; 707/104.1
(58) Field of Search .......................... 702/186; 705/10; 703/22, 13; 706/45, 47; 707/104.1; 345/745; 700/49; 717/100

(56) References Cited

U.S. PATENT DOCUMENTS

| | | | |
|---|---|---|---|
| 5,103,498 A | | 4/1992 | Wolf et al. |
| 5,201,034 A | | 4/1993 | Mori et al. |
| 5,958,008 A | * | 9/1999 | Pogrebisky et al. ........ 709/223 |
| 5,977,964 A | * | 11/1999 | Williams et al. ............ 345/721 |
| 5,978,784 A | | 11/1999 | Fagg, III et al. |
| 6,151,584 A | * | 11/2000 | Papierniak et al. ........... 705/10 |
| 6,363,353 B1 | * | 3/2002 | Chen ............................ 705/10 |
| 6,405,159 B2 | * | 6/2002 | Bushey et al. ................ 703/13 |
| 6,529,954 B1 | * | 3/2003 | Cookmeyer, II et al. ... 709/224 |
| 6,678,730 B2 | * | 1/2004 | Hellerstein et al. ......... 709/224 |
| 6,684,207 B1 | * | 1/2004 | Greenfield et al. ............. 707/3 |
| 6,714,975 B1 | * | 3/2004 | Aggarwal et al. .......... 709/224 |
| 6,751,661 B1 | * | 6/2004 | Geddes ....................... 703/223 |
| 2002/0054095 A1 | | 5/2002 | Endo et al. |

OTHER PUBLICATIONS

Klotz et al., A New Vendor Evaluation Product for SAP R/3 Systems, Sep. 14–15, 2000, ESIT 2000, pp. 458–464.*
Kmenta et al., Advanced FMEA Using Meta Behavior Modeling for Concurrent Design of Products and Controls, Sep. 13–16, 1998, ASME Design Eng. Tech Conferences.*
Kemper et al., Performance Tuning for SAP R/3, 1997, IEEE Computer Soc. Tech. Committee on Data Engineering.*
Horvitz, E. et al., "The Lumiere Project: Bayesian User Modeling for inferring theGoalsand Needs of Software Users," Uncertainty in Artificial Intelligence. Proceedings of the Conference, X, XX, pp. 256–265 (Jul. 24, 1998), XP000986618.

* cited by examiner

Primary Examiner—John Barlow
Assistant Examiner—Toan M. Le
(74) Attorney, Agent, or Firm—Fish & Richardson P.C., PA.

(57) ABSTRACT

Methods, systems and apparatus, including computer program products, for behavior-based adaptation of one or more computer systems. A method in accordance with the invention includes receiving rules that specify data of the computer system to be recorded and data of the computer system to be summarized for evaluation. The method includes recording data as specified by the rules. The method includes performing an evaluation of the data recorded. The evaluation includes identifying a change to the computer system and determining whether the change will increase the efficiency of the computer system. The method includes, when the evaluation indicates that the change will increase the efficiency of the computer system, proposing the change.

20 Claims, 3 Drawing Sheets

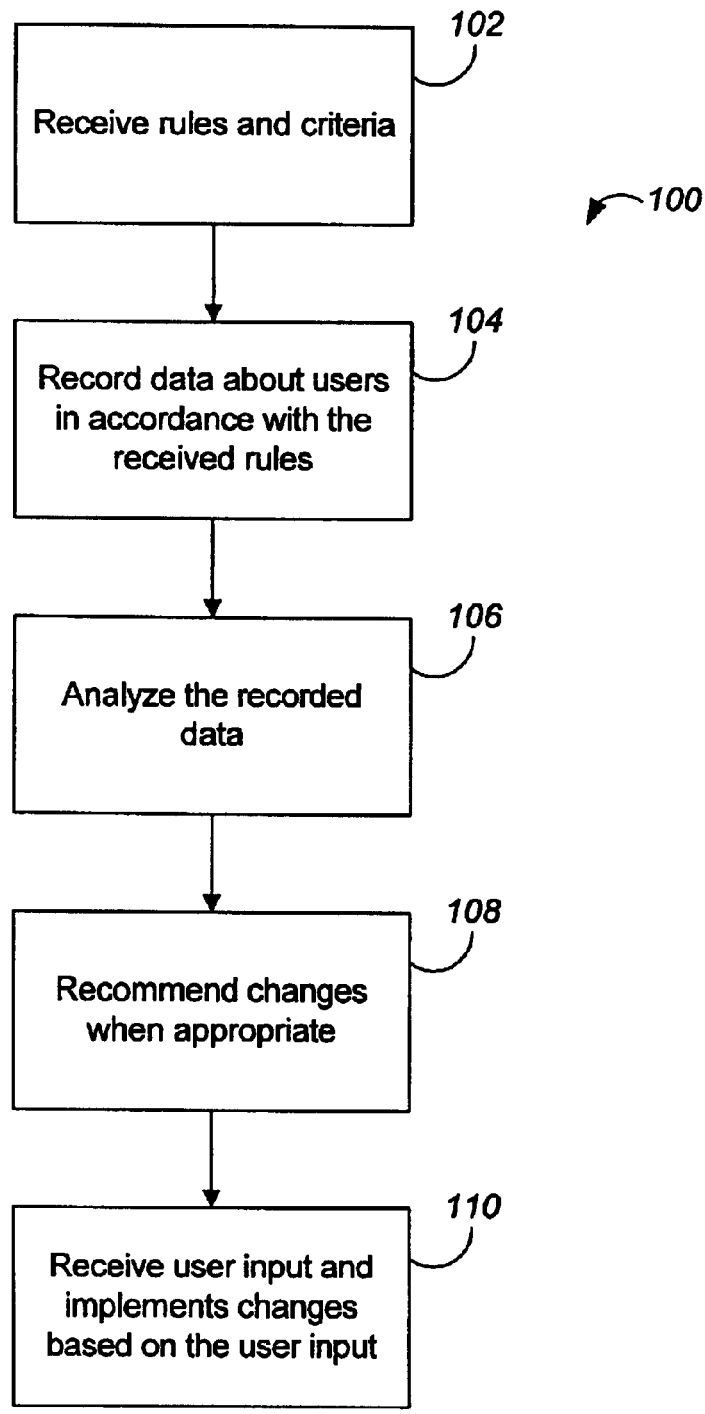
FIG._1

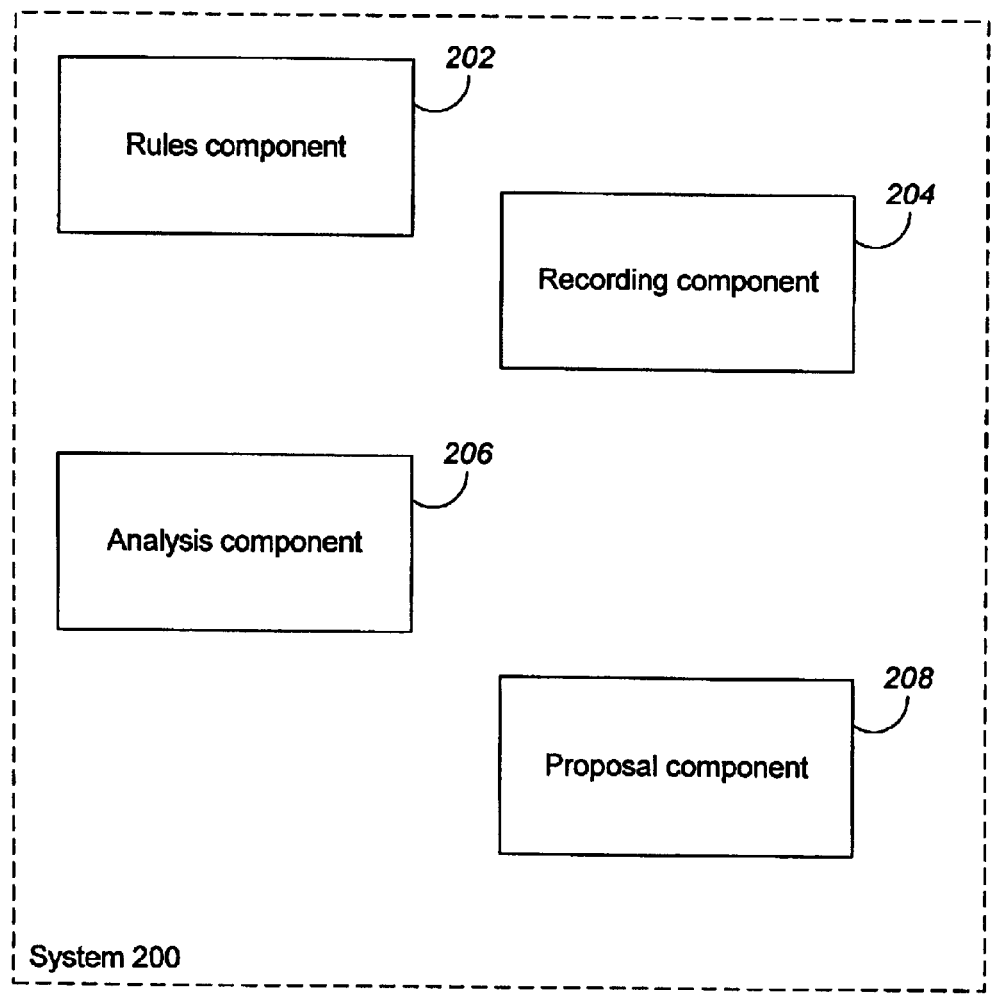
FIG._2

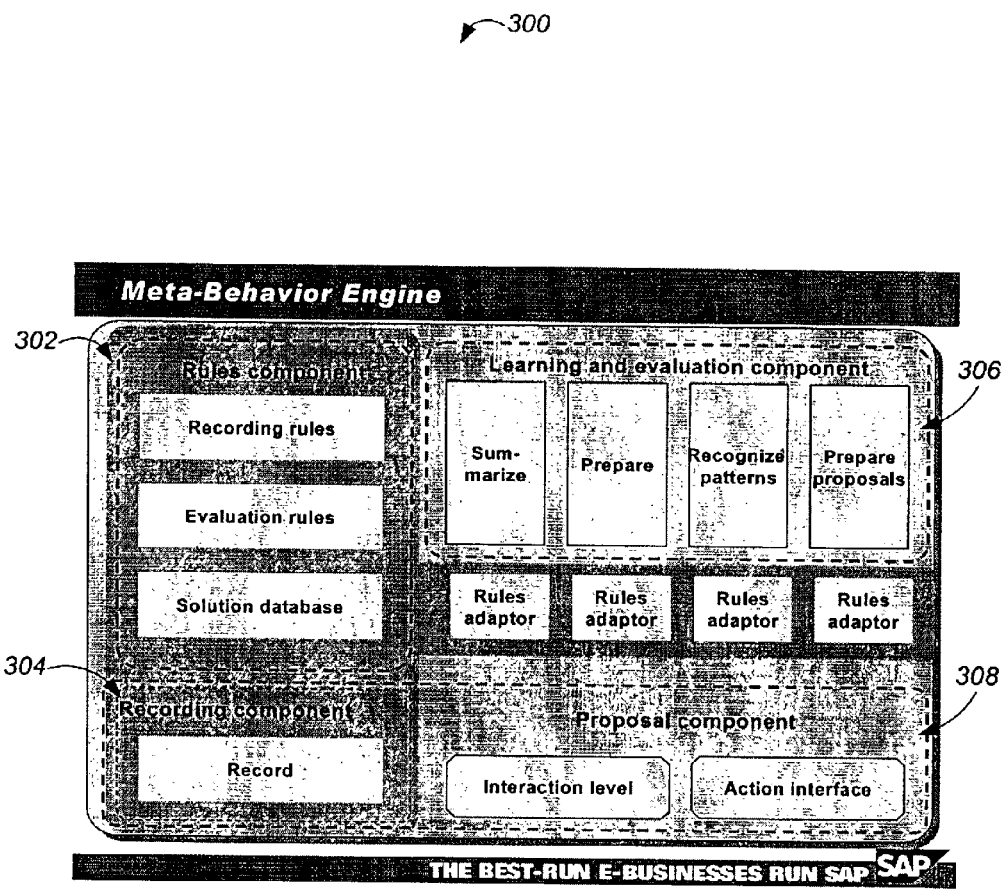
FIG._3

BEHAVIOR-BASED ADAPTATION OF COMPUTER SYSTEMS

BACKGROUND OF THE INVENTION

The present invention relates to computer systems.

Computer systems can include a back-end component, a middleware component, and a front-end component. The back-end component can be, e.g., a data server. The middleware component can be, e.g., an application server or a network server such as an Internet server. The front-end component can be a client computer that includes a graphical user interface and a browser. The components of the system can be connected by links, networks, or any combination of both links and networks.

Computer systems can also include computer-program products such as business applications, database management systems, and various types of engines. The computer-program products can be located at or distributed to any of the described components.

One example of computer system is the mySAP.com integrated E-business platform available from SAP AG of Walldorf, Germany. This platform includes a Product Lifecycle Management component that enables collaborative engineering, custom product development, and project, asset, and quality management among multiple business partners. This platform is comprehensive and complex. For example, the platform includes functions that users can execute to perform a task. There can be different functions for different users, depending on the user's role in an organization, process, or both.

SUMMARY OF THE INVENTION

The present invention provides methods and apparatus, including computer program products, for behavior-based adaptation of one or more computer systems.

In general, in one aspect, a method for adapting a computer system includes receiving rules that specify data of the computer system to be recorded and data of the computer system to be summarized for evaluation. The method includes recording data as specified by the rules. The method includes performing an evaluation of the recorded data to identify a change to the computer system and to determine whether the change will increase the efficiency of the computer system. The method includes, when the evaluation indicates that the change will increase the efficiency of the computer system, proposing the change.

In general, in another aspect, a computer program product, for adapting a computer system, includes instructions operable to cause a programmable processor to receive rules that specify data of the computer system to be recorded and data of the computer system to be summarized for evaluation. The product includes instructions to record data as specified by the rules. The product includes instructions to perform an evaluation of the recorded data for identifying a change to the computer system and for determining whether the change will increase the efficiency of the computer system. The product includes instructions to, when the evaluation indicates that the change will increase the efficiency of the computer system, propose the change. The product is tangibly stored on a machine-readable medium.

The invention can be implemented to realize one or more of the following advantages. A system in accordance with the invention records and analyzes user behavior and then recommends changes that will increase the efficiency of the organization, process, or both organization and process with which one or more users interface. The organization and process includes those of a computer system. The system so records information about user behavior as users interact with the system and, consequently, the users need not expend time and effort to provide the system with behavior information. The system can analyze individual as well as group behavior and recommend different changes for different users or different groups of users. Furthermore, the system can recommend changes for any aspect of an organization or process.

The details of one or more implementations of the invention are set forth in the accompanying drawings and the description below. Other features and advantages of the invention will become apparent from the description, the drawings, and the claims.

BRIEF DESCRIPTION OF THE DRAWINGS

FIG. 1 is shows a method in accordance with the invention for adapting computer systems.

FIG. 2 shows a system in accordance with the invention.

FIG. 3 shows an implementation of the system.

Like reference numbers and designations in the various drawings indicate like elements.

DETAILED DESCRIPTION

Method for Behavior-Based Adaptation of Computer Systems

FIG. 1 shows a method 100 in accordance with the invention for adapting computer systems. A system receives rules and criteria (step 102). The rules include those that specify which data the system will record and, in addition, those that specify which data the system will summarize for analysis. The criteria includes threshold data against which the system will compare recorded behavior data. The criteria is included in a database. Alternatively, the criteria can be implemented in any form accessible to the system.

The rules and criteria can be defined by an administrator or even the user for whom the system will apply the rules and criteria. The rules can include if-then logic as well as any other logic. Optionally, the rules are modifiable.

The system records data about users (step 104). The data recorded includes behavior, character, and environmental data. The system records the behavior data as users interact with the system. Behavior data of a user includes data objects the user accessed, dialogs the user calls, search methods the user employs, and actions the user takes with respect to a function. Character data of the user includes the user's identity and preferences. Environmental data of the user includes data describing the user's computing environment, such as the user's work area, as well as the user's real-world environment. The system can record data continuously, in batches, or in some combination of both in accordance with the received rules.

The system analyzes the recorded data (step 106). Analyzing can include summarizing recorded data and recognizing patterns in the recorded and summarized data. Examples of analysis include: recognizing that, during the course of performing a task, a user repetitively accesses several data objects which are linked to each other; deducing behavior patterns from search criteria the user specifies and proposing a more effective search criteria; proposing templates based on the user's previous searches (i.e., intelligent searching); recognizing that the user repeatedly uses particular data objects as a template or copy model; and recognizing that the user always contacts a particular entity after accessing a particular data object. The system can perform other analyses.

When appropriate, the system recommends changes (step 108). The system bases its recommendation on the analysis performed. Examples of recommendations include: proposing generating an iView or a change in a menu (an iView refers to any kind of application, information or service that can be rendered in a Web browser frame); an optimized search method, in response to the user starting a new project, proposing a previously used template or copy model to create the project; and steps of a process.

The system receives user input and implements the recommended changes based on the user input (step 110). Alternatively, the system can implement the changes and user input is required to override the changes.

A System for Behavior-Based Adaptation of Computer Systems

FIG. 2 shows a system 200 in accordance with the invention. The system 200 includes a rules component 202, a recording component 204, an analysis component 206, and a proposal component 208.

The rules component 202 includes recording rules, evaluation rules, and criteria, each of which performs the actions discussed above. The rules and criteria are stored at any component of a computer system, including a back-end component, middleware component, and front-end component. Optionally, the rules and criteria can be distributed among various components of the computer system.

The recording component 204 is a database management system that records data as specified by the rules component 202 in a database. Alternatively, the recording component can be any computer-program product or products for recording and storing data. Like the rules component 202, the recording component can be located at or distributed among any component of a computer system, including a back-end component, middleware component, and front-end component.

The analysis component 206 includes logic for learning and evaluating as described above. The proposal component 208 includes logic to use the analysis and make recommendations as described and, furthermore, can optionally include logic for receiving user input and effecting changes based on the analysis and user input. Like the rules component 202, both the analysis and proposal components 206 and 208, respectively, can be located at or distributed among any component of the computer system, including a backend component, middleware component, and front-end component.

Note that the system 200 can include the rules, recording, analyses, and proposal components in any arrangement. The arrangement illustrated in FIG. 2 is merely one of many possible arrangements.

An Implementation

FIG. 3 shows a meta-behavior engine 300, which is one implementation of the system 200. The meta-behavior engine is a mySAP.com solution for electronic data processing which records and evaluates the behavior pattern of an individual user or group of users and which makes proposals on how to work more efficiently. One purpose of this engine is to, e.g., optimize a user's work processes while using mySAP.com on a daily basis. The engine references both objects and dialogs in the system, as well as subsets of dialogs. The solution can also take other media into consideration such as mail systems and telephone contacts. The engine 300 includes a rules component 302, a recording component 304, a learning and evaluation component 306, and a proposal component 308.

Note that in a given working environment, such as the one of the meta-behavior engine 300, there is usually an object and an action. The action operates on or with the object. Collaborative aspects are also integrated into the solution, either as intra-relationships or interrelationships. The individual components of the meta-behavior engine are described in more detail in the following paragraphs.

The rules component 302 includes: rules that describe which data should be recorded, rules that describe which data will be summarized for evaluation purposes, and a solution database for comparing the actual values, i.e., recorded activities, with target values, i.e., proposals from the solution database.

The rules component serves as the central control element in the meta-behavior engine. This component can be set up by an administrator or by a user, if necessary. The user may, e.g., define his or her own settings for a rule such as a reaction frequency or a time span for the rule. In one implementation, the rules include primarily if-then logic with a corresponding framework.

The recording component 304 records the actions of users. Generally, the recording component 304 includes a database that records the specific data for a user or user group. The recording component 304 records, e.g., information about the user, the user's work area, the dialogs called, the objects that are processed, and so forth. Included in this information are behavior patterns such as search methods employed by the user or actions taken by the user with respect to a task or within an application. In addition, the recording component 304 can record contacts and the medium used for the contacts such as telephone, system, and mail.

With the help of the rules component 302 and the data accumulated by the recording component 304, the learning and evaluation component 306 summarizes the data for evaluation purposes. This summarized data is evaluated for the proposal component and provides the first proposals to the user. The learning and evaluation component 306 recognizes repetitive patterns that can lead to proposals for more effective and efficient working methods.

The following describes example operations of the learning and evaluation component 306. The evaluation component 306 recognizes that, during the course of a task, a user repetitively accesses several objects which are linked to one another (or which reference each other). The evaluation component 306 deduces behavior patterns from search criteria the user defines and proposes more effective search criteria that will lead to the same objective. The evaluation component 306 proposes templates based on the user's searches and provides intelligent searching. The evaluation component 306 recognizes that a project is repeatedly used as a template or copy model. The evaluation component 306 recognizes, for example, that the same person is always contacted by mail once an object has been processed.

The proposal component 308 uses the evaluations obtained from the learning and evaluation component 306 and interactively makes proposals to the user. This is the interaction portion of the proposal component 308. Based on the decision made by the user, the proposal component addresses the action interface, which in turn actively changes the system to suit the user's needs.

The following describes example changes. The proposal component 308 proposes the generation of an iView or a change in the menu. The proposal component 308 recommends an optimized search method. When the user creates a new project, the proposal component 308 proposes a previously used template or copy model to create the project. The proposal component 308 can determine and propose the required steps in a process such as, e.g., mail and telephone integration. The proposal for the type of medium type, e.g., depends on the attributes of the target person.

Example Scenario: Navigation in a Notification

A user receives e-mails several times a day from different individuals. This user role is to create malfunction reports or quality notifications from these e-mails. In doing so, the user always copies the long text from an e-mail first, using a cut and paste technique, after cumbersomely navigating the notification text.

The user performing this operation may not realize that the mail can be copied using a drag and drop technique, which is a new function. To do this however, a corresponding tab would need to be positioned in an active position at the front of a tab index.

The user performs this action repeatedly in the same manner, fives times within two hours. The meta-behavior engine 300 then prompts the user, informing the user of the alternative method of performing this operation. The user is asked whether the user would prefer to use the drag and drop method.

The user answers this question with a "yes." From this point on, the meta-behavior engine 300 always has the proper tab "active" to accommodate the receipt of the mail. Before the user saves and activates this change, the user can preview the result of the change. The prompt that was originally displayed to inform the user of the improved way of handling this task no longer appears.

The following describes the technical aspect of the example scenario. Two applications are registered for a new product that is an interface for an office mail application and notification processing function in the SAP System.

In the rules component 302, certain settings were made that instructed the system to record, among others, the following events in both applications:

Opening mail that contains specific keywords or that is sent by certain individuals;

Cutting and pasting text that is longer than eight lines;

Creating a notification for certain notification types and certain users; and

Documenting the navigation steps within a notification.

The rules specify that the meta-behavior engine is to suggest an improvement if the same sequence of steps is performed at least five times within a half of a day. The suggestion for improvement is taken from the solution database of the rules component 302. The recording component 304 makes sure that when the meta-behavior engine records the activities, all events recorded receive a time stamp. The learning and evaluation component 306 applies the rules to the recorded data and recognizes a repetitive pattern from the multitude of activities for which a proposal should be made. The proposal component 308 conducts a dialog with the user. On the basis of the user's answer "yes," the system now knows that the corresponding rule no longer needs to be applied in the same way. This rule change is documented by the meta-behavior engine 300.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication.

The invention has been described in terms of particular embodiments. Other embodiments are within the scope of the following claims. For example, the steps of the invention can be performed in a different order and still achieve desirable results. The system is not limited to being a meta-behavior engine but can be any computer-program product capable of performing the described operations. The described rules can be modifiable and are not limited to only the described examples but can include other and additional rules. The system can record behavior data for a particular user, a particular group of users, or some combination of them. The recommended changes can be changes to any aspect of the computer system.

What is claimed is:

1. A method for adapting a computer system, the method comprising:

receiving rules that specify data of the computer system to be recorded and data of the computer system to be summarized for evaluation;

recording data as specified by the rules;

performing an evaluation of the recorded data to identify a change to the computer system and to determine whether the change will increase the efficiency of the computer system; and when the evaluation indicates that the change will increase the efficiency of the computer system, proposing the change.

2. The method of claim 1, wherein receiving rules includes:

receiving rules specifying that data about a particular user having interactions with the computer system is to be recorded.

3. The method of claim 2, further comprising:

receiving rules specifying that behavior data of the user is to be recorded.

4. The method of claim 2, further comprising:

receiving rules specifying that environmental data of the user is to be recorded.

5. The method of claim 1, further comprising:

receiving rules that are modifiable.

6. The method of claim 1, wherein:

the computer system integrates multiple applications; and performing an evaluation includes identifying a change that affects at least two of the applications.

7. The method of claim 6, further comprising:

identifying a change to one of the multiple applications that is a business application.

8. The method of claim 6, wherein identifying a change includes:

identifying a change that affects a process of the computer system.

9. The method of claim 6, wherein identifying a change includes:

identifying a change that affects an arrangement of the computer system.

10. The method of claim 1, wherein performing an evaluation includes:

summarizing data recorded; and searching for patterns in the summarized data.

11. A computer program product, tangibly stored on a machine-readable medium, for adapting a computer system, comprising instructions operable to cause a programmable processor to:

receive rules that specify data of the computer system to be recorded and data of the computer system to be summarized for evaluation;

record data as specified by the rules;

perform an evaluation of the recorded data to identify a change to the computer system and to determine whether the change will increase the efficiency of the computer system; and when the evaluation indicates that the change will increase the efficiency of the computer system, propose the change.

12. The product of claim 11, wherein:

the rules specify that data about a particular user having interactions with the computer system is to be recorded.

13. The product of claim 12, wherein:

the rules specify that behavior data of the user is to be recorded.

14. The product of claim 12, wherein:

the rules specify that environmental data of the user is to be recorded.

15. The product of claim 11, wherein:

the rules are modifiable.

16. The product of claim 11, wherein:

the computer system integrates multiple applications; and the evaluation includes identifying a change that affects at least two of the applications.

17. The product of claim 16, wherein:

one of the multiple applications is a business application.

18. The product of claim 11, wherein:

the change identified affects a process of the computer system.

19. The product of claim 11, wherein:

the change identified affects an arrangement of the computer system.

20. The product of claim 11, wherein:

the change identified affects a process of the computer system.

* * * * *